No. 669,191. Patented Mar. 5, 1901.
G. W. WEBER.
STOP MOTION FOR MACHINES.
(Application filed Sept. 15, 1899.)
(No Model.) 2 Sheets—Sheet I.
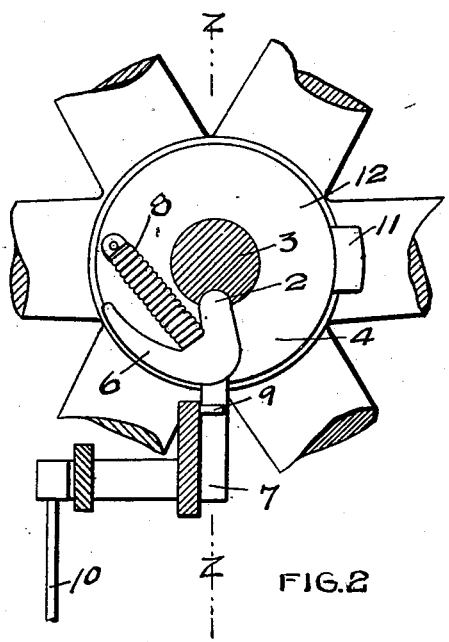
FIG. 2.
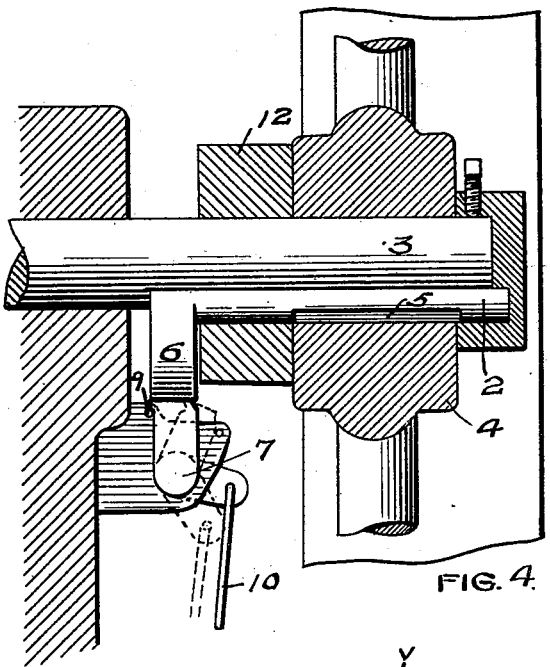
FIG. 4.
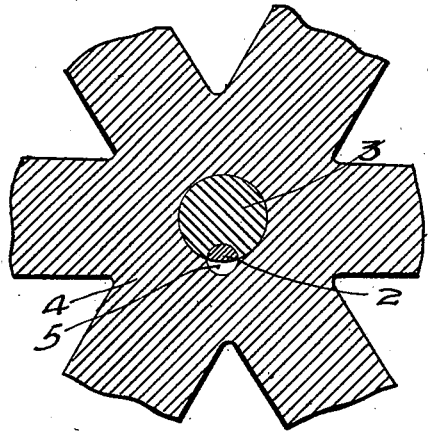
FIG. 3.
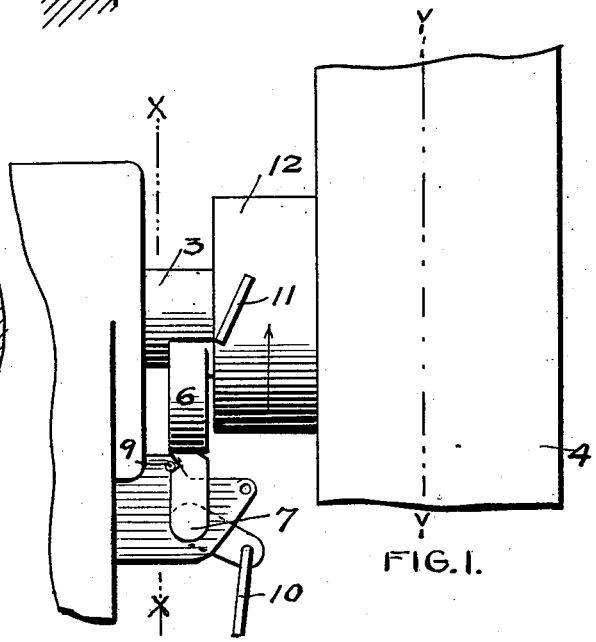
FIG. I.
WITNESSES.
E. Stause
Richard Paul
INVENTOR
GEORGE W. WEBER
BY Paul & Hawley
HIS ATTORNEYS.

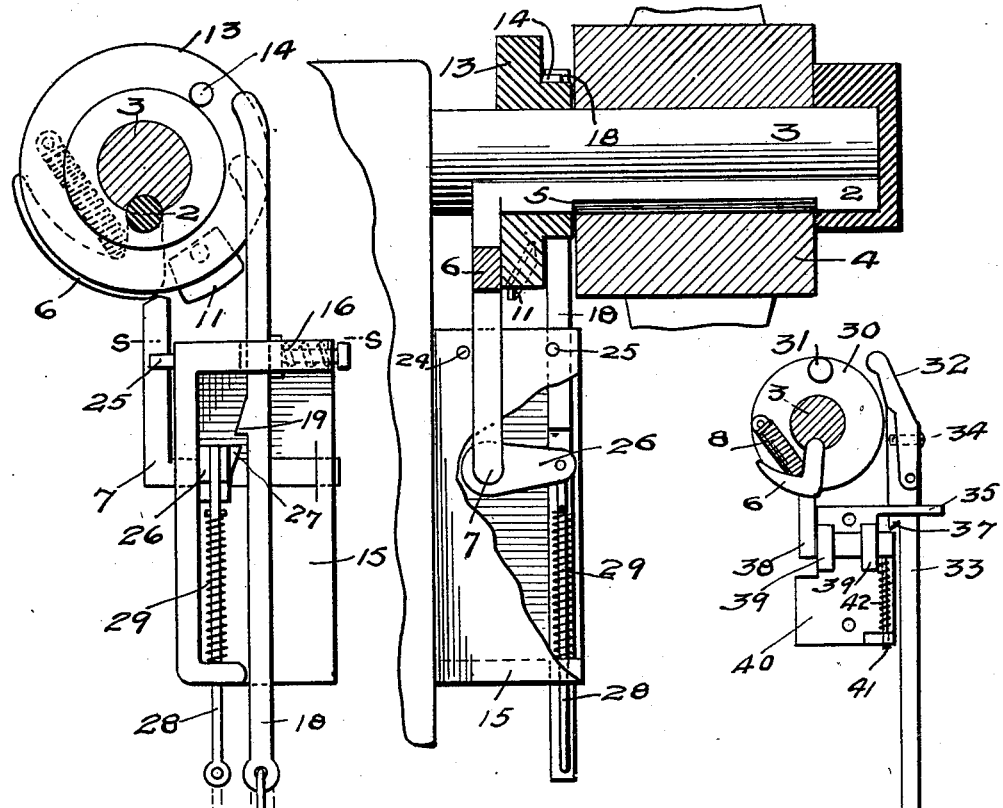

UNITED STATES PATENT OFFICE.

GEORGE W. WEBER, OF ST. PAUL, MINNESOTA.

STOP-MOTION FOR MACHINES.

SPECIFICATION forming part of Letters Patent No. 669,191, dated March 5, 1901.

Application filed September 15, 1899. Serial No. 730,545. (No model.)

*To all whom it may concern:*

Be it known that I, GEORGE W. WEBER, of St. Paul, county of Ramsey, State of Minnesota, have invented certain new and useful Improvements in Stop-Motions for Machines, of which the following is a specification.

The invention relates to stop mechanisms; and the object of the invention is to provide positive means operating in connection particularly with the feeding and riveting mechanism of a riveting-press, but applicable to all forms of presses for controlling the stroke or operation of the press, whereby accidents to the operator, breakage of the mechanism, and damage and consequent waste of the material upon which the machine is working are prevented.

The invention consists generally in means preventing the press from making several successive strokes or operations should the operator fail to remove his foot from the treadle after the first stroke.

Further, the invention consists in various constructions and combinations, all as hereinafter described, and particularly pointed out in the claims.

In the accompanying drawings, forming part of this specification, Figure 1 is a detailed view of a safety-clutch device embodying my invention. Fig. 2 is a sectional view on the line $x\ x$ of Fig. 1. Fig. 3 is a similar view on the line $y\ y$ of Fig. 1. Fig. 4 is a sectional view on the line $z\ z$ of Fig. 2. Fig. 5 is a side view of a modified form of clutch device. Fig. 6 is a detailed sectional view of the same. Fig. 7 is a horizontal section of Fig. 5, taken on the line $s\ s$. Fig. 8 is a modification of the clutch mechanism illustrated in Figs. 5 and 6.

Power-presses are usually released by a lever or treadle within reach of the foot of the operator in connection with a clutch mechanism, and as soon as the press is started the operator should remove his foot from the treadle and permit the machine to stop after making one stroke or revolution. Should the operator fail to remove his foot, the plunger will continue to reciprocate, and as his attention is fixed on the work before him it frequently happens that he does not remember to release the treadle after the machine starts, and the plunger making an unexpected second descent either crushes his hand, damages the mechanism of the machine, or the material upon which it is working. It is this second unexpected descent of the plunger that causes nearly all accidents to operators, damage to dies, and waste of material, and one of the essential features of my invention is to provide means in connection with the releasing mechanism to prevent the press from making a second revolution and the plunger from making a second descent even though the operator fails to remove his foot from the treadle after starting the machine. In the accompanying drawings I have shown a mechanism common to machines of this kind for starting the press and consisting, preferably, of a clutch 2, fitting within a socket in the shaft 3 and the hub or bearing of the pulley 4, as shown in Figs. 1 to 4. This clutch has a cut-away portion 5 within the socket, the edge of which is engaged by the pulley when the clutch is operated to start the machine, and said clutch is provided at its inner end with an arm 6 in engagement with one arm of a bell-crank 7, which normally holds said clutch out of engagement with the pulley against the pressure of the spring 8 on the hub of said pulley. A pin 9 limits the movement of the upper arm of the bell-crank in one direction, and it is moved in the other by a link 10, connected with the lower arm of the bell-crank, and with a treadle, which when operated disengages the bell-crank from the arm 6, permitting the clutch to be thrown into engagement with the pulley to start the machine.

To insure the disengagement of the clutch from the pulley and the momentary stoppage of the machine at the end of each stroke, I prefer to provide an inclined rib or wing 11 on a collar 12, that is secured on the shaft 3. This wing is arranged to engage the upper arm of the bell-crank and positively actuate it and force it back into engagement with the arm 6 to disengage the clutch from the pulley. If the operator removes his foot from the treadle after the machine starts, the locking-latch or bell-crank will be returned by its spring to its normal position in engagement with the clutch; but should the spring for any reason fail to operate the bell-crank or should the operator keep his foot on the treadle after the machine starts, so that when the machine has nearly completed its stroke the bell-crank is still in its retracted position, then it will be engaged by the wing or rib and actuated to disengage the clutch. The wing will engage the bell-crank only when it remains in its retracted position and the machine has nearly completed its stroke. I therefore regard the wing or rib as a safety device operating only when the bell-crank spring fails to perform its function or the operator fails to release the treadle after starting the machine.

In Figs. 5, 6, and 7 I have shown a modified means for operating the clutch mechanism to permit the machine to stop at the end of each stroke, which consists in a disk 13 on the shaft 3, having on one side a pin or lug 14 and the wing 11 in its periphery. A bracket 15 is arranged on the frame of the press near the pulley and clutch mechanism, having a web 16, provided with a slot 17, wherein a bar 18 is slidable vertically, said bar having an inwardly-curved upper end and a shoulder 19 near its middle and connected at its lower end by a suitable means with the operating-treadle. The bar 18 is normally held in the contracted inner end of the slot 17 by a block 20, provided at the inner end of a stem 21 and held in engagement with shoulders 22 by a spring 23. The lower arm of the bell-crank is mounted in suitable bearings in the bracket 15, while its upper arm is normally in engagement with the clutch mechanism and is limited in its travel in either direction by pins 24 and 25, provided in the edge of the bracket 15. An arm 26, secured to the lower arm of the bell-crank, projects laterally therefrom and is provided at its outer end with a shoulder or lug 27 in position to be engaged by the lug 19, and a rod 28, vertically movable in a guide on said bracket, is pivotally connected to the outer end of said arm 26 and is normally held in a raised position by a spring 29. In operation, the treadle being depressed, the lug 19 engaging the lug or shoulder 27 operates the bell-crank and releases the clutch mechanism, causing it to be thrown into engagement with the pulley and start the machine. As soon as the machine starts if the operator releases the treadle the spring 29 will throw the bell-crank back to its normal position and disengage the clutch. Should the operator, however, fail to release the treadle, the pin 14 engaging the curved end of the bar 18 will throw the same to the right, disengaging the lugs 19 and 27 and permitting the spring 29 to return the bell-crank to its normal position. In case the spring 29 should fail to operate the bell-crank it will be engaged by the wing 11 and thrown into engagement with the clutch. These mechanisms, however, while forming important features in my invention, are not called into operation unless the operator fails to release the treadle when the machine starts or in case of accident to the mechanism, such as breaking of a spring or other part.

In Fig. 8 I have shown a modification of the safety device illustrated in Figs. 5 and 6, which consists in providing a disk 30, having a pin 31 near its circumference to engage a finger 32, pivoted on a bar 33 and rendered adjustable thereon by means of a set-screw 34, passing through said finger into a threaded opening in said bar. The upper end of the bar 33 is movable vertically in a guide 35, and its lower end is connected with the treadle by suitable means and also to the frame or base of the machine by a pivoted link 36. A notch 37 is provided in the edge of said bar to engage the latch or bell-crank 38, adapted to rock in bearings 39 on a plate 40, and a rod 41, vertically movable in a guide on said plate and carrying a spring 42, normally holds said latch or bell-crank in engagement with the clutch mechanism. By means of the set-screw 34 the operator may adjust the finger in any desired position with respect to the pin 31 to permit it to be engaged by said pin or not, as desired. If the finger is adjusted in position to be engaged by the pin 31, the bar 33 will be disengaged from the latch to permit it to operate the clutch mechanism and allow the machine to stop at the end of each stroke or revolution of the press even if the operator should not remove his foot from the pedal. Should it be desired to make several consecutive strokes, the operator may move the finger outside the path of the pin 31, and the latch being held out of engagement with the clutch device by the downward movement of the bar 33 and the treadle will permit the machine to run continuously as long as the operator keeps his foot on the treadle.

It is obvious that the safety devices which I have illustrated and described may be modified in various ways, and I therefore do not wish to be confined to the particular construction herein set forth.

Having thus described my invention, I claim as new and desire to secure by Letters Patent—

1. In a machine of the class described, the combination, with a shaft and a driven pulley thereon, of a clutch device adapted to engage said pulley, a locking-latch normally engaging said clutch device to hold it out of engagement with said pulley, a treadle, a sliding bar connected therewith and adapted to engage said latch to disengage it from said clutch when the treadle is depressed, means for disengaging said treadle connection from said latch to permit the latter to return to its normal position, and means independent of said treadle and its connections for engaging said latch and returning it to its normal position should the operator fail to release the treadle before the machine completes its stroke, substantially as described.

2. In a machine of the class described, a clutch device, a locking-latch engaging the same, a treadle, means operated by said treadle for disengaging said latch from said clutch, and a wing or lug provided near said locking-latch to engage the same and return it to its normal position in engagement with said clutch only when said latch remains in its retracted position and the machine has nearly completed its stroke, substantially as described.

3. In a machine of the class described, the combination, with a shaft and a driven pulley thereon, of a clutch engaging said pulley a treadle connection, locking means engaging said clutch to be operated when the treadle is depressed, means for disengaging said treadle connection from said locking means, a collar provided on said shaft, and a wing or lug provided on said collar to engage said locking means and throw it into engagement with said clutch to stop the machine should the operator fail to release the treadle before the machine completes its stroke or revolution.

4. The combination, with a shaft and a driven pulley loosely arranged thereon, of a clutch to engage said pulley, a spring-actuated locking device engaging said clutch to normally hold it out of engagement with said pulley, a treadle, means connected with said treadle and operating said locking device when the treadle is depressed, means for throwing said treadle-connected means out of engagement with said locking device should the operator fail to release the treadle before said shaft completes its revolution, and means for positively actuating said locking device to return it to its normal position should its spring fail to operate it after being released from said treadle-connected means, substantially as described.

5. The combination, with a shaft and a driven pulley loosely arranged thereon, of a clutch to engage said pulley, a spring-actuated latch engaging said clutch to hold it out of engagement with said pulley, a treadle, a vertically-movable bar connected with said treadle and engaging said latch when said treadle is depressed, means provided on said shaft engaging said bar when said shaft is near the end of its revolution to throw said bar out of engagement with said latch should the operator fail to release the treadle before said shaft reaches the end of its revolution, and positive means for returning said latch to its normal position should its spring fail to operate it after being disengaged from said bar, substantially as described.

6. In a machine of the class described, the combination, with a shaft and a driven pulley thereon, of a rotary clutch to engage said pulley, a disk on said shaft provided with a pin or lug, a spring-actuated pivoted latch engaging said clutch, a treadle, a vertically-movable bar connected therewith and adapted to engage said locking-latch and swing it out of engagement with said clutch, and the upper end of said bar being in position when said treadle is depressed to be engaged by said pin or lug when said shaft has nearly completed its revolution and disengaged from said locking-latch should the operator fail to remove his foot from the treadle before the machine has completed its stroke, substantially as described.

7. In a machine of the class described, the combination, with a shaft and the driven pulley thereon, of a clutch, a locking-latch engaging said clutch, a spring normally holding said latch in engagement with said clutch, a disk provided on said shaft, a pin or lug on said disk, a treadle, a bar connected therewith and having a notch to engage said locking-latch, the upper end of said bar being in position to be engaged by said pin and operated to release said locking-latch, and a wing or rib provided on said disk in position to engage said latch should its spring fail to return it to its normal position after being disengaged from said bar, substantially as described.

8. The combination, with a clutch, of a pivoted spring-actuated latch normally in engagement therewith, a treadle, a vertically-slidable bar connected with said treadle and having a notch or lug to engage said latch when the treadle is depressed and means engaging said bar to disengage it from said latch to permit it to return to its normal position when the machine is near the limit of its stroke.

9. The combination, with a rotary clutch, of a spring-actuated latch engaging the same, a treadle, a longitudinally-sliding bar connected therewith, means for holding said bar in position to engage and trip said latch when the treadle is depressed, and means operating said bar to release said latch when the machine is near the limit of its stroke.

10. The combination, with a shaft and a driven pulley thereon, of a clutch, a spring-actuated latch engaging the same, a treadle, a longitudinally-sliding bar connected therewith, means for holding said bar in position to engage and trip said latch when the treadle is depressed, a disk provided on said shaft, a pin provided in the face of said disk and engaging said bar to operate it and release said latch when the shaft is near the end of its revolution, substantially as described.

11. The combination, with a shaft and a loose pulley thereon, of a spring-actuated rotary clutch, means normally locking said clutch out of engagement with said pulley, means within control of the operator for operating said locking means to release said clutch, and means for engaging and positively actuating said locking means only when it remains in its retracted position and the machine has nearly completed its stroke.

12. The combination, with a shaft, and a loose pulley thereon, of a clutch provided on said shaft to engage said pulley, locking means engaging said clutch to hold it out of engagement with said pulley, a treadle, means connected therewith and engaging said locking means to disengage it from said clutch when the treadle is depressed, and means for engaging and positively actuating said locking means only when it remains in its retracted position as the machine nears the completion of its stroke.

13. The combination, with a loose pulley and its shaft, of a clutch provided on said shaft, a latch normally engaging said clutch to hold it out of engagement with said pulley, means within control of the operator for operating said latch to release said clutch and start the machine, and means for engaging and positively actuating said locking means only when it remains in its retracted position as the machine nears the completion of its stroke.

In witness whereof I have hereunto set my hand this 8th day of September, 1899.

GEORGE W. WEBER.

In presence of—
C. G. HAWLEY,
M. C. NOONAN.